United States Patent Office 2,822,018
Patented Feb. 4, 1958

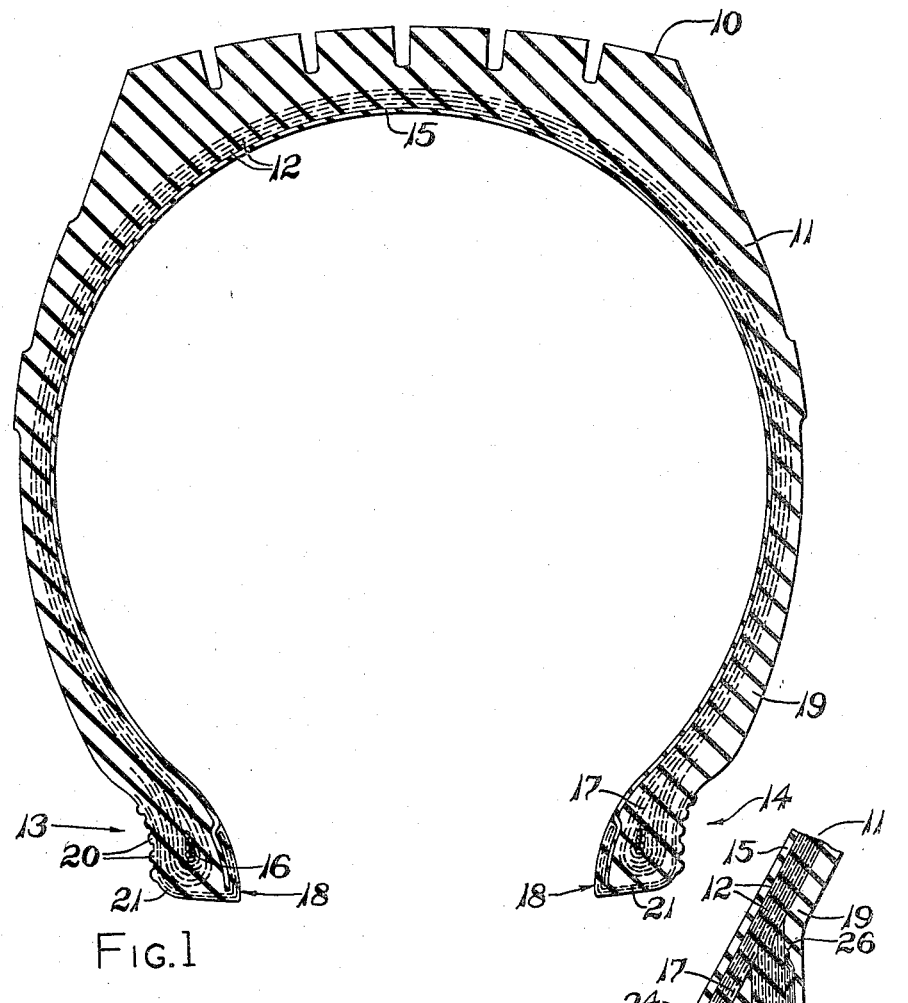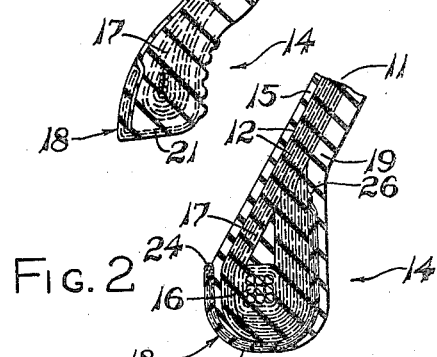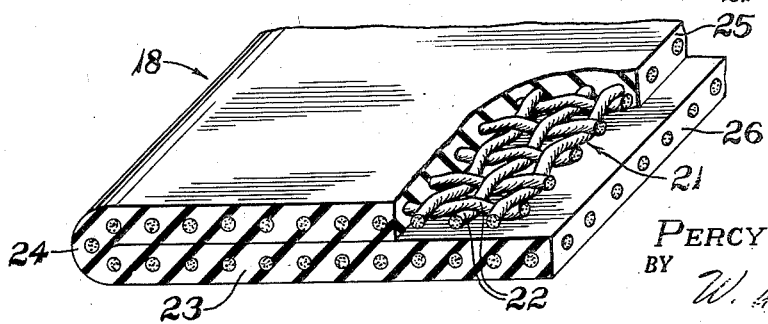

2,822,018
TUBELESS TIRE

Percy W. Perdriau, Cuyahoga Falls, Ohio, assignor to The B. F. Goodrich Company, New York, N. Y., a corporation of New York Application November 18, 1955, Serial No. 547,805

11 Claims. (Cl. 152—362)

This invention relates to inflatable tubeless tires and, more particularly, to an improved construction for the chafers or finishing strips of such tires.

An inflatable tire of the tubeless type utilizes the tire and the wheel rim on which it is mounted as the chamber for the inflation fluid, which is generally air. In such an assembly, the bead regions of the tire must form a fluid-tight seal with the rim and the interior of the carcass must be sufficiently impervious to the inflation fluid to prevent appreciable loss of the latter. Consequently, the interior of the tire carcass is preferably provided with a lining or layer of substantially impervious elastomeric material and the outer surfaces of the tire beads have an abrasion resistant elastomeric covering in which are formed circumferentially extended ribs or projections that provide a sealing engagement with the side flanges of the rim on which the tire is mounted. The bead regions of a tire are, however, subjected to a certain amount of stress and/or chafing due to flexing of the tire in negotiating corners, curves and irregularities in the roadway so that it is customary to provide each of these regions of the tire with a chafing or finishing strip which is a relatively narrow strip of fabric formed of twisted multiple filament cords interconnected in a square or leno weave.

In conventional tire constructions the chafer or finishing strips extend exteriorly of the carcass plies from a location within the air containing chamber, provided by the tire and rim, across the bead bases and radially of the tire carcass to locations above the rim flanges. The strips are dipped or coated with sufficient elastomeric material to cover the surface thereof but the fabric is quite close to the outer surface of the tire bead and hence portions of the fabric are frequently exposed either during curing or during subsequent mounting or use of the tire. Such exposure of the cords of the strips provides a passage for the air or other inflation fluid along the exposed cords or through the interstices thereof, the fluid either being lost to the atmosphere or entering into the body of the tire carcass where ply separation or related defects may be produced by this fluid.

In an effort to eliminate the above mentioned difficulties encountered with conventional chafer or finishing strips, tubeless tires have been constructed in which such strips are omitted. This omission, however, undesirably reduces the strength and flex resistance of the tire beads. Moreover, since the elastomeric materials of the bead regions become somewhat fluid during the molding and curing operation, there is a tendency for the ends of the reinforcing plies of the carcass, which are turned about the bead cores, to shift. This further weakens the beads and may even cause some of the ply cord ends to pull through the elastomeric material or so close to the surface that there is exposure to the inflation fluid in the tire thereby causing loss of pressure and/or premature tire failure due to ply separation, tread separation or other related causes.

The principal object of this invention is, therefore, to provide an improved tubeless tire construction wherein chafer or finishing strips are provided by a plurality of interconnected multifilament cords disposed so that inflation fluid cannot enter the cord ends and pass through the interstices between the cords, whereby strengthening of the tire beads and proper retention of the ends of the carcass plies are achieved without sacrifice of the imperviousness of this portion of the tire to the inflation fluid contained therein.

A more specific object of the invention is to provide an improved tubeless tire wherein the beads thereof are provided with chafer or finishing strips of fabric comprising a plurality of cords each formed of a plurality of synthetic filaments twisted together, the fabric being folded lengthwise and disposed with the folded edge adjacent the toe of the tire bead so that no cord ends are positioned where they can be exposed to the inflation air in the tire.

A still more specific object of the invention is to provide an improved tubeless tire wherein the tire beads are each provided with a finishing strip of woven fabric, having intersecting warp and weft cords each of which is formed of a plurality of twisted filaments, each strip being folded lengthwise with the folded edge extending circumferentially of a bead adjacent the toe thereof and having an elastomeric covering united with the elastomeric material of the tire carcass.

The invention further resides in certain novel features of construction of a tubeless tire in which the invention is embodied, and further objects and advantages thereof will be apparent to those skilled in the art to which the invention pertains from the following description of the presently preferred embodiment taken in conjunction with the accompanying drawing, forming a part of this application, in which:

Fig. 1 is a fragmentary transverse sectional view through an inflatable tubeless tire constructed in accordance with this invention;

Fig. 2 is an enlarged fragmentary sectional view of one bead of the tire shown in Fig. 1 prior to curing thereof more clearly illustrating the construction; and Fig. 3 is an enlarged perspective view of the improved finishing strip employed in constructing the tire illustrated in Fig. 1 with a part of the elastomeric covering removed to more clearly show the nature of the fabric reinforcement.

Referring first to Fig. 1 of the drawing, the inflatable vehicle tire illustrated therein includes a tread portion 10 surrounding an annular inner carcass 11 of resilient elastomeric material, such as natural or synthetic rubber, and reinforcing cords, the latter being disposed in superposed plies 12. The inner periphery of the tire is defined by spaced bead portions 13 and 14 which are adapted to fit on the rim of a vehicle tire and cooperate therewith to provide a chamber for the inflation fluid without the need of a separate tube or container. Therefore, the interior of the tire carcass is preferably provided with a layer or lining 15 of an impervious elastomeric material such as the isoolefindiolefin copolymer commonly known as butyl rubber.

The bead regions 13 and 14 of the tire are identical and each is formed by turning the edges of the cord plies 12 successively about a circumferentially extending bead core such as 16, which may be formed by a bundle of wires suitably wrapped and provided with a flipper strip 17, the ends of which extend radially of the sidewall of the tire. Extending externally over the turned ends or edges of the reinforcing cord plies 12 in each bead is a chafer or finishing strip 18. These strips are relatively narrow and extend transversely of the tire beads with the inner edge of each strip positioned within the interior of the tire carcass just above the bead toe. The strips extend across the bead bases and radially of the sidewalls a short distance to positions therein above the outer edges of the flanges of tire rim on which the tire is adapted to be mounted. The finishing strips 18 are provided with an elastomeric material or materials so that during curing of the tire they unite with the elastomeric materials of the inner layer or liner 15, with the carcass plies 12 and with the outer covering or sidewall rubber 19. Also during the curing and molding operations of the tire, the outer side surfaces of the beads are provided with circumferentially extending sealing ribs or projections 20.

Tires constructed in this manner and having the cords of the chafer or finishing strips 18 formed of a plurality of filaments twisted together provide good strength and flex resistance. However, when the fabric of the strips 18 is of the conventional type the cords extending transversely of the beads have one end adjacent the bead toe on the interior of the tire and the other end in the outer sidewall of the tire. During curing, the cord ends adjacent the bead toes tend to pull through their elastomer covering or so close to the surface that they are soon exposed to the inflation fluid in the tire allowing passage of the fluid along the cord or between the individual filaments thereof. This passage of fluid, known as wicking, results in loss of inflation pressure when the cord communicates both with the interior of the tire and the atmosphere. A more serious condition, however, occurs when the inflation fluid thus permeating a cord or cords of the finishing strip cannot vent externally of the tire since such fluid then forms a pocket or pockets within the body of the tire producing ply and/or tread separation which is highly detrimental to the life of the tire.

Attempts to remedy wicking of fabrics utilized as chafer or finishing strips by merely providing thicker layers of elastomeric material upon the conventional fabric have been unsuccessful, since as mentioned heretofore, the elastomeric material is substantially fluid during curing of the tires so that the cords of the fabric can still become exposed during molding or move so close to the surface that there is exposure of a portion of the cords after only relatively minor chafing or flexing of the beads. Weaving the finishing strip fabric from monofilaments eliminates the possibility of wicking through the cords but not along the exterior thereof which may still occur when the bonding of the elastomeric covering to the fabric is not complete. Moreover, monofilament fabric does not possess the optimum flex resistance or many of the other characteristics desired in a finishing strip.

In accordance with this invention, the advantages of employing a chafer or finishing strip of multifilament yarns or cords are retained, while the difficulties of fluid wicking therealong or therethrough are eliminated, by employing in such strips fabric formed of cords arranged so that the cords extending transversely of the strips have no ends located in a region exposed to the inflation fluid of the tire. This is achieved by doubling or folding the strips lengthwise and disposing the strips in the tire so that the folded edges of the strips are adjacent the toes of the tire beads and the free edges of the strips terminate in the outer sidewalls of the tire. In the preferred embodiment, the fabric of the finishing strips is formed from interwoven cords each composed of bundles of twisted, continuous, synthetic filaments or fibers.

In the illustrated embodiment, the farbric 21 of the finishing strip 18 is shown to an enlarged scale in Fig. 3 as comprising intersecting warp and weft cords 22 disposed in an open, square weave and provided with a coating or covering 23 of elastomeric material. The warp and weft cords of this fabric are identical and each is formed of a plurality of twisted, continuous, synthetic filaments of a linear polyamide, commonly referred to as nylon, which may be of the type described in U. S. Patents 2,071,250, 2.071,253, 2,130,523 or 2,130,948. Filaments of other types may, however, be employed and the invention is not limited to a fabric formed of nylon cords nor to cords having a particular number of filaments or degree of twist. Moreover, fabric formed of cords interconnected by a leno or other weaves may be utilized. The elastomeric material 23 is preferably substantially air-impervious, such as the issolefin-diolefin copolymer commonly known as butyl rubber, and may be applied to the fabric 21 by any known procedure. The elastomer may be applied uniformly to both sides of the fabric or may be provided in greater thickness on one side than on the other.

The elastomer coated fabric is severed into strips 18 having a width in the order of twice the width of conventional chafer or finishing strips and a length sufficient to extend circumferentially around a tire bead. The strips are then folded lengthwise, as represented in Figs. 2 and 3 of the drawing and are incorporated into the beads of a tire carcass exteriorly of the carcass cord plies 12 with the folded edge 24 of the strip innermost and overlying the lower edges of the lining 15 adjacent the bead toes. The outer edges of the strips extend outwardly around the beads and terminate in the lower portions of the outer sidewalls of the tire inwardly of the sidewall elastomer covering 19. The two portions of the folded strip, measured from the folded edge 24 to the outer edges 25 and 26, preferably are of different widths so that these edges are in stepped relationship in the tire sidewall as will be readily understood by those skilled in the art of tire building.

The tire thus constructed is then placed in a suitable mold and subjected to heat and pressure in the conventional manner so that the elastomer of the chafer or finishing strips is united with the elastomers of the tire carcass, the liner, and the sidewalls thereof. During this operation the elastomer on the outer surfaces of the tire beads flows into suitable configurations of the mold thereby forming the sealing ribs 20. A tire thus constructed may be mounted and used in the same manner as other tubeless tires but has improved characteristics in that there can be no fluid wicking through the bead regions since no ends of transversely extending cords of the fabric 21 in the finishing strip can be exposed to the inflation fluid due to termination of all such ends externally of the fluid chamber or container formed by the interior of the tire and the rim on which it is mounted.

The invention has been described in detail in conjunction with an illustration of but one specific embodiment. It will be apparent, however, that the principles of the invention can be utilized with fabric containing chafer or finishing strips in which the cords are interconnected otherwse than in a square weave. Thus, the cords may be united in a leno weave or may be arranged in a weftless, or substantially weftless, fabric united by the elastomer covering, the cords being angularly disposed relative to the length of the strip so that the cord lengths in the two portions of the folded strip extend in different directions. Likewise, when the fabric of the strip is woven it may be cut on the bias so that the cords extending transversely of the strip do so at an angle to the length of the strip.

In view of the above specifically mentioned and other equivalents and adaptions of the invention, which will be readily apparent to those skilled in the art, the invention is not to be considered limited to the specific example herein illustrated and described in detail except as may be required by the spirit and scope of the appended claims.

Having thus described the invention, I claim:

1. In a tubeless tire having spaced circumferentially extending beads, a finishing strip incorporated in each of said beads with each strip extending laterally of a bead base and outwardly therefrom to a region in the outer sidewall of the tire, the said strips each comprising a plurality of interconnected multifilament cords arranged so that the cords extending transversely of the beads have both ends terminating in the outer sidewall of the tire, and a covering of elastomeric material on said cords.

2. In a tubeless tire having spaced circumferentially extending beads, a finishing strip incorporated in each of said beads with each strip extending laterally of a bead base and outwardly therefrom to a region in the outer sidewall of a tire, the said strips each comprising a plurality of interconnected cords composed of bundles of continuous synthetic filaments, with the cords extending transversely of the beads having both ends terminating in the outer sidewalls of the tire, and a layer of elastomeric material covering said cords.

3. In a tubeless tire having spaced circumferentially extending beads, a finishing strip incorporated in each of said beads with each strip extending laterally of a bead base and outwardly therefrom to a region in the outer sidewall of the tire, the said strips each comprising a folded fabric formed of multifilament cords with the folded edge disposed adjacent the bead toe and extending circumferentially so that no cord ends communicate with the interior of the tire, and a layer of elastomeric material covering the cords of said fabric.

4. In an inflatable tubeless tire having spaced circumferentially extending beads, a two ply chafer or finishing strip in each bead comprising a single strip of elastomeric covered fabric folded longitudinally and positioned with the folded edge innermost, whereby inflation fluid cannot enter the fabric at the inner edge thereof.

5. In a tubeless tire having spaced circumferentially extending beads, a fabric strip incorporated in each of said beads with each strip extending circumferential of a bead laterally across a bead base and outwardly therefrom to a region in the outer sidewall of the tire, the said strips each comprising interconnected multifilament cords covered with elastomeric material and doubled by folding the strip lengthwise, the said strips being positioned so that the free edges of each strip terminate at said region in an outer sidewall of the tire.

6. In a tubeless tire having an integral impervious elastomeric lining and spaced circumferentially extending beads, a finishing strip incorporated in each of said beads with each strip extending across a bead base and outwardly therefrom to a region in the outer sidewall of the tire, the said strips each comprising fabric formed of a plurality of multifilament cords doubled by folding the strip lengthwise, the said strips being positioned so that the free ends of each strip terminate at said region in the outer sidewall of the tire, and an elastomeric material covering the cords of each strip and united with the said lining.

7. In a tubeless tire having an integral air-impervious elastomeric lining and spaced circumferentially extending beads, a finishing strip in each bead comprising a fabric formed of a plurality of interwoven multiple filament cords covered with a substantially air-impervious elastomeric material, each strip being folded lengthwise with the folded edge extending circumferentially of a bead adjacent the toe thereof and having the elastomeric material on the strip united with said liner.

8. A tubeless tire comprising a cord reinforced elastomeric carcass having spaced circumferentially extending beads provided with bead cores about which the ends of the cord reinforcements are turned, and a fabric strip disposed outwardly of the cord reinforcements and extending across the base of each bead and radially of the outer sides thereof a limited distance beyond the bead bases, the fabric in each of said strips being composed of a plurality of interconnected multifilament cords arranged so that the cords extending transversely of the bead have both ends terminating in the corresponding outer sidewall of the tire, and an elastomeric covering over the cords of said fabric united with the carcass.

9. A tubeless tire comprising a cord reinforced elastomeric carcass having spaced circumferentially extending beads provided with head cores about which the ends of the cord reinforcements are turned, and an elastomeric covered fabric strip disposed outwardly of the cord reinforcements and extending across the base of each bead and radially of the outer sides thereof a limited distance beyond the bead bases, the fabric in each of said strips being composed of woven multifilament cords, each strip being folded lengthwise and having the folded edge disposed adjacent the toe of the bead in which it is incorporated.

10. A tubeless tire comprising a cord reinforced elastomeric carcass having spaced circumferentially extending beads provided with bead cores about which the ends of the cord reinforcements are turned, and a fabric strip disposed outwardly of the cord reinforcements and extending across the base of each bead and radially of the outer sides thereof a limited distance beyond the bead bases, the fabric in each of said strips being composed of interwoven multifilament cords, each strip being folded lengthwise and having the folded edge disposed adjacent the toe of the bead in which it is incorporated, the said strips also including elastomeric material thereon covering the cords of the strips and united with the elastomeric carcass.

11. A tubeless tire comprising a hollow annular body of resilient elastomeric material open at the radial inner portion and having wheel-engaging bead portions at the inner periphery, circumferentially extending bead cores disposed in the bead portions, reinforcing cord plies embedded in said annular body and extending from bead portion to bead portion with the edges of the plies turned around said bead cores, a finishing strip in each of said bead portions outwardly of said reinforcing plies with each of said strips extending a limited distance beyond the wheel-engaging area of the bead portion in which it is embedded, the said strips each comprising a textile fabric formed from interwoven multifilament cords with the strip folded lengthwise and with the folded edge positioned adjacent the toe of the bead, and a layer of elastomeric material on the fabric of each of said strips covering the cords thereof and united with the elastomeric material of the carcass.

References Cited in the file of this patent

UNITED STATES PATENTS

| 2,000,869 | Taylor | May 7, 1935 |
| 2,698,042 | Perkins | Dec. 28, 1954 |

FOREIGN PATENTS

| 204,095 | Great Britain | Sept. 17, 1923 |